(12) United States Patent
Schuijers et al.

(10) Patent No.: US 12,062,194 B2
(45) Date of Patent: Aug. 13, 2024

(54) IMAGING SYSTEM AND IMAGING METHOD

(71) Applicant: KONINKLIJKE PHILIPS N.V., Eindhoven (NL)

(72) Inventors: Erik Gosuinus Petrus Schuijers, Breda (NL); Rieko Verhagen, Vught (NL); Jonathan Palero, Waarle (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 324 days.

(21) Appl. No.: 17/286,513

(22) PCT Filed: Dec. 6, 2019

(86) PCT No.: PCT/EP2019/083922
§ 371 (c)(1),
(2) Date: Apr. 19, 2021

(87) PCT Pub. No.: WO2020/120295
PCT Pub. Date: Jun. 18, 2020

(65) Prior Publication Data
US 2021/0358141 A1 Nov. 18, 2021

(30) Foreign Application Priority Data
Dec. 14, 2018 (EP) .................... 18212565

(51) Int. Cl.
*G06T 7/33* (2017.01)
*G06T 5/20* (2006.01)
(Continued)

(52) U.S. Cl.
CPC ............ *G06T 7/33* (2017.01); *G06T 5/20* (2013.01); *G06T 5/50* (2013.01); *G06T 7/246* (2017.01); *G06T 7/70* (2017.01)

(58) Field of Classification Search
CPC ..... G06T 7/33; G06T 5/20; G06T 5/50; G06T 7/246; G06T 7/70
See application file for complete search history.

(56) References Cited

U.S. PATENT DOCUMENTS 6,011,875 A  1/2000  Laben
7,327,788 B2 * 2/2008  Kadono ............... H04N 19/51
                                                375/E7.1
(Continued)

FOREIGN PATENT DOCUMENTS

WO       2013/172963       11/2013

OTHER PUBLICATIONS

International Search Report and Written Opinion Dated Mar. 5, 2020 for International Application No. PCT/EP2019/083922 Filed Dec. 6, 2019.

(Continued)

*Primary Examiner* — Edward F Urban
*Assistant Examiner* — Benedict E Lee

(57) ABSTRACT

According to an aspect, there is provided an imaging system (1) for imaging of subjects. The imaging system (1) comprises: a spectral camera (2) configured to capture a spectral image of a subject (6) in a spectral capture period comprising a plurality of spectral time points, the spectral image comprising a plurality of spectral frames each captured at a wavelength of a plurality of wavelengths and each corresponding to a spectral time point of the plurality of spectral time points: a reference camera (3) configured to capture a reference image of the subject (6) in a reference capture period comprising a plurality of reference time points and corresponding to the spectral capture period, the reference image comprising a plurality of reference frames each corresponding to a reference time point of the plurality of reference time points and a spectral frame of the plurality of spectral frames: a calculation unit (4) configured to calculate (Continued)

a motion vector for each reference frame of a subset of the plurality of reference frames: and an alignment unit (5) configured to align the spectral frames with each other by applying each calculated motion vector to the spectral frame of the plurality of spectral frames to which it corresponds. According to other aspects, there is provided an imaging method for imaging of subjects and a computer program which, when executed on a computing device, carries out a method of imaging of subjects.

20 Claims, 3 Drawing Sheets

(51) Int. Cl.
*G06T 5/50* (2006.01)
*G06T 7/246* (2017.01)
*G06T 7/70* (2017.01)

(56) References Cited

U.S. PATENT DOCUMENTS

| | | | |
|---|---|---|---|
| 10,010,278 | B2 | 7/2018 | Darty |
| 10,999,602 | B2* | 5/2021 | Kim .................... H04N 19/547 |
| 2012/0062740 | A1 | 3/2012 | Treado |
| 2012/0105600 | A1* | 5/2012 | Meyer ................... G06T 11/006 |
| | | | 348/E13.074 |
| 2012/0194661 | A1* | 8/2012 | Lee ...................... A61B 5/0084 |
| | | | 348/E7.085 |
| 2012/0328178 | A1* | 12/2012 | Remiszewski .......... G06T 11/60 |
| | | | 382/133 |
| 2013/0100249 | A1* | 4/2013 | Norita .................. H04N 13/257 |
| | | | 348/46 |
| 2013/0308826 | A1* | 11/2013 | Asano .................. H04N 13/271 |
| | | | 382/106 |
| 2014/0354802 | A1* | 12/2014 | Ohtomo ............... G02B 27/126 |
| | | | 348/135 |
| 2017/0094233 | A1 | 3/2017 | Lin |
| 2017/0224260 | A1 | 8/2017 | Darty |
| 2017/0299436 | A1* | 10/2017 | Horie .................... G01J 3/0289 |
| 2017/0303790 | A1 | 10/2017 | Bala |
| 2018/0103883 | A1* | 4/2018 | Darty ................. A61B 5/14552 |
| 2018/0276469 | A1* | 9/2018 | Richards ................ H04N 23/11 |
| 2018/0278848 | A1* | 9/2018 | Nishiyama .......... H04N 23/6811 |
| 2019/0250107 | A1* | 8/2019 | Sreenivasan ........... G01N 21/95 |
| 2019/0276469 | A1* | 9/2019 | Schaefer ................. A61Q 13/00 |
| 2021/0256280 | A1* | 8/2021 | Ito .......................... G06V 40/10 |

OTHER PUBLICATIONS

Clancy, et al: "Multispectral imaging of organ viability during uterine transplantation surgery", Progress in Biomedical Optics and Imaging, vol. 8935, Feb. 26, 2014.
Ben-Ezra, et al: "Motion Deblurring Using Hybrid Imaging", 2003 IEEE Computer Society Conference on Computer Vision and Pattern Recognition, 2003. Proceedings.
Gunnar Farneback: "Two-Frame Motion Estimation Based on Polynomial Expansion", SCIA 2003: Image Analysis pp. 363-370.
David G. Lowe: "Distinctive Image Features from Scale-Invariant Keypoints", International Journal of Computer Vision vol. 60, pp. 91-110(2004).
Fischler, et al: "Random Sample Consensus: A Paradigm for Model Fitting with Apphcations to Image Analysis and Automated Cartography", Communication of the ACM, Jun. 1981.
Kohl, et al: "Adversarial Networks for the Detection of Aggressive Prostate Cancer", MICCAI 2017.

* cited by examiner

IMAGING SYSTEM AND IMAGING METHOD

CROSS REFERENCE TO RELATED APPLICATIONS

This application is the U.S. National Phase application under 35 U.S.C. § 371 of International Application No. PCT/EP2019/083922 filed Dec. 6, 2019, which claims the benefit of European Patent Application Number 18212565.8 filed Dec. 14, 2018. These applications are hereby incorporated by reference herein.

FIELD OF THE INVENTION

The present invention relates to imaging systems, such as, for example, multispectral and hyperspectral imaging systems, as well as to an imaging method, a computer program and a computer readable medium.

BACKGROUND OF THE INVENTION

The general background of this invention is spectral imaging or spectral analysis. Spectral imaging, such as multispectral or hyperspectral imaging, provides a rich amount of information that is not readily obtainable from single or triple spectral channel (for example, RGB) imaging. The benefit of spectral imaging is more evident when imaging more complex subjects, such as, for example, the human skin. When imaging human skin, the detected back-scattered light is modulated by several chromophores including haemoglobin, melanin, water, lipids, carotenoid and bilirubin.

Reflectance spectroscopy is the study of light as a function of wavelength. It finds many applications, such as, for example, medical applications, material analysis and soil analysis. Reflectance spectroscopy is enabled by the fact that different materials have different absorption and scattering spectra. This is also true for the chromophores in the human skin, such as oxygenated and deoxygenated haemoglobin, carotenoids, melanin, bilirubin, etc. Therefore, reflectance spectroscopy of the human skin allows for a detailed decomposition of the chromophores present. It is therefore an interesting technique to relate detected chromophores to (systemic) health, as well as specific skin conditions that cannot be resolved by the human eye and/or traditional RGB camera systems.

Reflectance spectroscopy typically observes only the spectrum of a single point or area. When reference is made to multispectral imaging or hyper-spectral imaging, a whole grid (or image) is observed at different wavelengths. Hyperspectral imaging may typically rely on one of two techniques: Narrowband lighting with wideband image capturing and Wideband lighting with narrowband image capturing (through tunable filters). The first technique has the disadvantage that only a limited set of narrowband lights can be easily generated. Therefore, the second technique is often preferable. Other methods exist, such as hyperspectral push broom scanning, mosaic multispectral imaging, gradient colour filter imaging and others.

For the case of frame sequential hyperspectral imaging, a spectral image typically consists of a sequence of frames (which may be considered as a short movie) where, for each frame, a filter is tuned to a specific wavelength or to a wavelength of a wavelength gradient/map. In practice such a spectral image scan therefore typically takes up to a couple of seconds to be completed. Movement of the subject being imaged may mean that the frames of the sequence will not be aligned, resulting in blur and lower spatial contrast of the spectral image.

It is therefore desirable to provide an imaging system in which frames of a spectral image are aligned, to minimise blur and maximise spatial resolution.

SUMMARY OF THE INVENTION

According to an embodiment of a first aspect, there is provided an imaging system for imaging of subjects, the imaging system comprising: a spectral camera configured to capture a spectral image of a subject in a spectral capture period comprising a plurality of spectral time points, the spectral image comprising a plurality of spectral frames each captured at a wavelength of a plurality of wavelengths and each corresponding to a spectral time point of the plurality of spectral time points; a reference camera configured to capture a reference image of the subject in a reference capture period comprising a plurality of reference time points and corresponding to the spectral capture period, the reference image comprising a plurality of reference frames each corresponding to a reference time point of the plurality of reference time points and a spectral frame of the plurality of spectral frames; a calculation unit configured to calculate a motion vector for each reference frame of a subset of the plurality of reference frames; and an alignment unit configured to align the spectral frames with each other by applying each calculated motion vector to the spectral frame of the plurality of spectral frames to which it corresponds.

Thus, according to embodiments of the present invention, the frames of the captured spectral image may be aligned using the frames of the captured reference image. Accordingly, since the frames of the spectral image are aligned, blur in the image may be minimised and the spatial resolution of the image may be maximised. The imaging system may also be considered as an image alignment system and/or an image processing system.

The spectral frames are each captured at a wavelength of a plurality of wavelengths. The plurality of wavelengths may be considered as a wavelength gradient/map, such that each spectral frame is captured at a wavelength of the wavelength gradient/map. The wavelength gradient/map may relate to a gradient filter technique for hyperspectral imaging. Such a technique may rely on shifting a gradient colour filter back and forth in front of a camera while images are being taken, or shifting the entire camera with filter for alternatively the object) while taking successive images, so as to build up a hyperspectral cube, with frames corresponding to the relevant wavelengths. This technique may also use a variable gradient colour LCD filter for rapid sweeping. Such techniques still suffer from misalignment and so motion compensation and realignment according to embodiments of the present invention is applicable.

Each spectral frame may be captured at a different wavelength, or two or more spectral frames may be captured at the same wavelength. Furthermore, all of the frames may be captured at the same wavelength. For example, the spectral camera may be configured to capture a spectral image in which all frames of the image are captured at a single wavelength, or at two wavelengths (for example, with two spectral cameras). Spectral frames captured at the same or one of two wavelengths may be considered to provide a movie or video of a certain wavelength or pair of wavelengths. This may be used, for example, when capturing blood oxygenation of a human subject as a function of time.

Therefore, the spectral camera of the imaging system may be further configured to capture a second spectral image of the subject in the spectral capture period. The second spectral image may comprise a plurality of second spectral frames each captured at a wavelength of the plurality of wavelengths and each corresponding to a spectral time point of the plurality of spectral time points. Each of the second spectral frames may be captured at a different wavelength to each of the (first) spectral frames of the (first) spectral image. This may, for example, be realised in a time-multiplexed fashion, where individual frames of both spectral images may be captured alternatingly.

Alternatively to the spectral camera capturing two spectral images, the imaging system may comprise two spectral cameras (a first spectral camera and a second spectral camera). That is, the spectral camera discussed above may be a first spectral camera and the imaging system may further comprise a second spectral camera configured to capture a second spectral image of the subject in the spectral capture period. The second spectral image may comprise a plurality of second spectral frames each captured at a wavelength of a plurality of wavelengths. Each of the second spectral frames may be captured at a different wavelength to each of the (first) spectral frames of the (first) spectral image.

There may be practical reasons for incorporating multiple spectral cameras in the imaging system, such as, for example, a limited bandwidth that each camera sensor may capture. For example, in the case that a large bandwidth spanning from the visible range to the infrared range is to be scanned, it may be preferable to have one camera substantially capture the visible range and to have another camera capture the infrared range. Additionally having multiple cameras may speed up acquisition time as images may be captured in parallel.

The spectral frames are captured during a spectral capture period comprising a plurality of spectral time points and the reference frames are captured during a reference capture period comprising a plurality of reference time points. The spectral capture period corresponds to the reference capture period such that a spectral time point corresponds to a reference time point and the frames captured at the respective time points also correspond. The number of spectral time points may be equal to the number of spectral frames, such that a spectral frame is captured at each of the spectral time points. Conversely, the number of spectral frames may be less than or more than the number of spectral time points. For example, a spectral frame may be captured at every other spectral time point. The time points of the reference camera (the reference time points of the reference capture period) and the time points of the spectral camera (the spectral time points of the spectral capture period) may match or they may not match, for example, as for an approach which uses interpolation, as discussed below.

The spectral capture period and the reference capture period are independent but may be similar or substantially equal such that the spectral image and the reference image are captured at approximately the same time. The reference camera may therefore capture any motion of the subject that occurs while the spectral images are being taken. The capture periods are not necessarily the same and may not have the same frame rate. The number of spectral frames may not be the same as the number of reference frames. However, given the corresponding relationship between the capture periods and their respective periods, each spectral frame corresponds to one or more reference frame and each reference frame corresponds to one or more spectral frame. That is, a spectral frame corresponds to a reference frame which was captured at approximately the same time, such that the position of the subject may be substantially the same in each of the frames. A spectral frame may also correspond to more than one reference frame, and vice versa. For example, if the motion of the reference camera is established at times t1 and t3 (which may be called M1 and M3, respectively), and a spectral frame is captured at time t2, where t1<t2<t3, then a motion M2 may be interpolated, for example, linearly, using: $M1+(M3-M1)*(t2-t1)/(t3-t1)$.

In other words, the spectral camera (such as, for example, a multispectral or hyperspectral camera) captures multiple consecutive frames. For that capture interval, defined from the time of the first frame, to the time of the last frame, motion correction may be applied. The motion may be estimated from the reference frames, which are captured in approximately the same time interval. This means that the first reference frame may be at the very latest only slightly later than the first spectral frame (but may preferably be before or at the same time), and the last reference frame may be at the very earliest only slightly before the last spectral frame (but may preferably be after or at the same time). Provide that there are sufficient reference frames in between to determine the motion, the correction may be provided. The exact motion at the timings of the spectral frames may then be interpolated for extrapolated slightly at the edges if needed). In other words, there is no requirement for the spectral capture period and the reference capture period to be synchronised. The time stamps of the capture periods may be predetermined or may be established from the captured frames.

Ideally, motion of the subject is captured by the reference camera with at least 10 frames per second. When the (human) subject is sufficiently mechanically stabilized, for example, by means of a head rest, motion can then be captured highly accurately. At such frame rates, motion can be predicted reliable up to 2 or 3 frames. Hence, the capture period of the reference camera may start not later than 200-300 ms after the start of the capture period of the spectral camera. Similarly, the capture period of the reference camera may end not earlier than 200-300 ms before the end of the capture period of the spectral camera. However, it may be preferable for the capture period of the reference camera to completely encapsulate the capture period of the spectral camera.

Considering an example in which the reference frames are captured at times t1 and t3 and a spectral frame is captured at time t2, in order to establish the motion at t2, interpolation may be applied. If the motion at time t1 with reference to some reference frame at t0 is referred to as M1, and the motion at time t3 with reference to the same reference frame at t0 is referred to as M3, the motion M2 at time t2 may be approximated using: $M1+(t2-t1)/(t3-t1)*(M3-M1)$. More advanced interpolation schemes may also be applied, which may depend on more time points, such as, for example, cubic interpolation.

It is noted that the individual images captured as part of a sequence of images that make up the spectral image and the reference image are referred to in this specification as frames, for example, spectral frames and reference frames. A set or sequence of frames are referred to as an image. That is, the plurality or sequence of spectral frames collectively provide the spectral image and the plurality or sequence of reference frames collectively provide the reference image.

The subject to be imaged may be, for example, a human subject (i.e. a person or a specific area of a person, such as the face) and embodiments of the invention may be described with respect to imaging a human subject. However, the imaging system of the present invention is not limited to a specific type of subject to be imaged and may be applied to any spectral imaging system and the imaging of any subject.

The plurality of spectral frames may be considered as a sequence, stack, or collection of spectral frames that together provide the spectral image. The spectral image may also be considered as a sequence or collection of frames that provide a short video, with each of the frames captured at any wavelength of a plurality of wavelengths. That is, each spectral frame may be captured at a different wavelength or one or more spectral frames may be captured at the same wavelength. The plurality of reference frames may be considered as a sequence, stack, or collection of reference frames that together provide the reference image. The plurality of wavelengths that the spectral image is captured at may be wavelengths from among wavelengths of two or more contiguous spectral bands. The spectral bands may be from the ultraviolet range up to and including the infrared range. The wavelengths may also be wavelengths from specific wavelength ranges from across one or more spectral bands.

The calculation unit calculates a motion vector for each reference frame of a subset of the plurality of reference frames. The subset of the plurality of reference frames may comprise any number of reference frames from one reference frames to all of the plurality of reference frames. Thus, a motion vector may be calculated for only one reference frame, each reference frame of the plurality of reference frames, or any number of reference frames in between. Accordingly the number of reference frames in the subset of reference frames may be any whole number between one and a number equal to the total number of reference frames captured by the reference camera. The subset may preferably comprise the majority of the plurality of reference frames, such as, for example, 90% of the captured reference frames, so that a motion vector is calculated for each of the majority of reference frames.

A motion vector for a reference frame may comprise a set or map of motion vectors. That is, the calculation unit may be configured to calculate a set or map of motion vectors for each reference frame of the subset of the plurality of reference frames. Each set or map of motion vectors may comprise two or more motion vectors, each corresponding to a pixel in the reference frame. In other words, a set or map of motion vectors may comprise a plurality of motion vectors, each corresponding to a combination of (x, y) coordinate pairs.

The alignment unit may align the spectral frames such that an alignment site of the subject has the same coordinates in each of the hyperspectral frames. That is, a feature of the imaged subject may be an alignment site or reference point and the frames may be aligned such that the feature appears at the same coordinates in each of the frames. The alignment site of the subject may correspond to a spatial location associated with a position of the subject with respect to the imaging system. In other words, the alignment site may be a spatial location at which the feature of the subject is positioned with respect to the imaging system and, in particular, the spectral camera.

The imaging system may be a system for capturing hyperspectral images or multispectral images. The spectral camera may therefore be a hyperspectral camera, the spectral image may be a hyperspectral image and the plurality of spectral frames may be hyperspectral frames. Similarly, the spectral camera may be a multispectral camera, the spectral image may be a multispectral image and the plurality of spectral frames may be multispectral frames.

An imaging axis of the spectral camera may correspond to an imaging axis of the reference camera. The imaging axes of the cameras may be common/shared or they may be substantially common such that the imaging axis of the reference camera corresponds and is comparable to the imaging axis of the spectral camera but is not identical.

The calculation unit may be configured to calculate each of the motion vectors by: estimating an amount of spatial displacement for each of the plurality of reference frames with respect to a given reference frame of the plurality of reference frames; and mapping the displacement for each reference frame using a predetermined mapping function between the reference frames and the hyperspectral frames. The alignment unit may be configured to align the spectral frames with each other by: applying the mapped displacement for each reference frame to the corresponding spectral frame.

Each motion vector for a reference frame may comprise a set or map of motion vectors. The calculation unit may be configured to calculate each motion vector of the set or map of motion vectors by: estimating an amount of spatial displacement for each combination of x,y coordinate pairs in each of the plurality of reference frames with respect to the x,y coordinate pairs of a given reference frame of the plurality of reference frames; and mapping the displacement of each x,y coordinate pair for each reference frame using a predetermined mapping function between the reference frames and the hyperspectral frames. The alignment unit may be configured to align the spectral frames with each other by: applying the mapped displacement for each combination of x,y coordinate pairs in each reference frame to the corresponding spectral frame.

Instead of estimating and mapping the spatial displacement of each combination of x,y coordinate pairs in a reference frame, the calculation unit may be configured to estimate an amount of spatial displacement for each combination of x,y coordinate pairs of a subset of x,y coordinate pairs in each of the plurality of reference frames with respect to the corresponding x,y coordinate pairs of a given reference frame of the plurality of reference frames; and map the displacement of each x,y coordinate pair of the subset of x,y coordinate pairs for each reference frame using a predetermined mapping function between the reference frames and the hyperspectral frames. The subset of x,y coordinate pairs may comprise the majority (for example, 90%) of x,y coordinate pairs of a reference frame.

The translation from frame to frame may typically be a function of spatial location, such that the spatial displacement may be in the x-direction and the y-direction, with respect to the given reference frame. The given reference frame may be the first captured reference frame, i.e. the frame captured at the start of the reference capture period. The spatial displacement may be determined using any suitable algorithm, such as, for example, Farnebäck's optical flow. Each of the plurality of reference frames may be converted to grayscale prior to determining the displacement.

The mapping function may be calculated. Specifically, the calculation unit may be configured to calculate the mapping function by: identifying a spectral set of points in the spectral image corresponding to features of the subject; identifying a reference set of points in the reference image corresponding to the features of the subject; conducting a regression between the spectral set of points and the reference set of points; and determining the mapping function from the regression. The imaging system may further comprise a user input configured to receive input from a user of the imaging system. The spectral set of points and the reference set of points may be identified in accordance with input from the user.

The calculation unit may alternatively be configured to calculate the mapping function by: applying a landmark detection technique to a spectral frame corresponding to a first time point: applying a landmark detection technique to a reference frame corresponding to the first time point; applying a homomorphic mapping technique to the spectral frame and the reference frame; and determining the mapping function from the homomorphic mapping technique.

The reference camera may be a wideband visible range camera or the reference camera may be a narrowband camera. The reference camera may be a monochrome camera; or the reference camera may be an RGB camera. The monochrome camera may also be considered as a grayscale camera, i.e. a camera for obtaining monochrome or grayscale images and frames. A broadband signal may preferably be used.

The reference camera may be configured to capture the reference image at a predetermined (fixed) bandwidth. The reference camera may be configured to capture the reference image at a predetermined (fixed) wavelength.

The spectral camera may comprise optics configured to capture light reflected from the subject; a tunable filter through which the captured light passes and configured to filter the light to a wavelength of the plurality of wavelengths; and a wideband imaging sensor configured to capture the light coming through the tunable filter into a spectral frame. The tunable filter may sequentially be tuned to each of the plurality of wavelengths, such that a spectral frame is captured at each of the plurality of wavelengths. The filter may be retuned at each of the spectral time points of the spectral capture period such that a spectral frame with a different wavelength is captured at each time point. The number of spectral time points may correspond to the number of wavelengths of the plurality of wavelengths. For example, the number of wavelengths and the number of spectral time points may be equal, or the number of wavelengths may be a fraction, for example half, the number of spectral time points.

Alternatively, the filter may be tuned such that each of the spectral frames are captured at the same wavelength or such that more than one frame is captured at the same wavelength. In this case, for example, the filter may not be retuned at each spectral time point but at each time point of n time points, where n is a whole number less than or equal to the number of spectral time points in the spectral capture period.

The reference camera may comprise: optics configured to capture light reflected from the subject; and an imaging sensor through which the captured light passes and configured to output a reference frame. A reference frame may be captured at each of the reference time points of the reference capture period.

The present invention extends to method aspects corresponding to the system aspects. The imaging method may also be considered as an image alignment method or image processing method.

In particular, according to an embodiment of a second aspect, there is provided a method comprising: capturing a spectral image of a subject in a spectral capture period comprising a plurality of spectral time points, the spectral image comprising a plurality of spectral frames each captured at a wavelength of a plurality of wavelengths and each corresponding to a spectral time point of the plurality of spectral time points; capturing a reference image of the subject in a reference capture period comprising a plurality of reference time points and corresponding to the spectral capture period, the reference image comprising a plurality of reference frames each corresponding to a reference time point of the plurality of reference time points and a spectral frame of the plurality of spectral frames; calculating a motion vector for each reference frame of a subset of the plurality of reference frames; and aligning the spectral frames with each other by applying each calculated motion vector to the spectral frame of the plurality of spectral frames to which it corresponds.

Features and sub-features of the system and apparatus aspects may be applied to the method aspects and vice versa.

The present invention extends a computer program aspects which, when executed on a computing device, carries out an imaging method, according to any of the method aspects of the invention or any combination thereof.

In particular, according to a third aspect, there is provided a computer program, which, when executed on a computing device, carries out a method of imaging of subjects, the method comprising: capturing a spectral image of a subject in a spectral capture period comprising a plurality of spectral time points, the spectral image comprising a plurality of spectral frames each captured at a wavelength of a plurality of wavelengths and each corresponding to a spectral time point of the plurality of spectral time points; capturing a reference image of the subject in a reference capture period comprising a plurality of reference time points and corresponding to the spectral capture period, the reference image comprising a plurality of reference frames each corresponding to a reference time point of the plurality of reference time points and a spectral frame of the plurality of spectral frames; calculating a motion vector for each reference frame of a subset of the plurality of reference frames; and aligning the spectral frames with each other by applying each calculated motion vector to the spectral frame of the plurality of spectral frames to which it corresponds.

Aspects of the invention, such as, for example, the controller, may be implemented in digital electronic circuitry, or in computer hardware, firmware, software, or in combinations of them. Aspects of the invention may be implemented as a computer program or computer program product, i.e., a computer program tangibly embodied in an information carrier, e.g., in a machine-readable storage device or in a propagated signal, for execution by, or to control the operation of, one or more hardware modules. A computer program may be in the form of a stand-alone program, a computer program portion or more than one computer program and may be written in any form of programming language, including compiled or interpreted languages, and it may be deployed in any form, including as a stand-alone program or as a module, component, subroutine, or other unit suitable for use in a communication system environment. A computer program may be deployed to be executed on one module or on multiple modules at one site or distributed across multiple sites and interconnected by a communication network.

Aspects of the method steps of the invention may be performed by one or more programmable processors executing a computer program to perform functions of the invention by operating on input data and generating output. Aspects of the apparatus of the invention may be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

It may therefore be seen that embodiments of the present invention may provide means for aligning frames in a spectral image, such as a multispectral or hyperspectral image, such that blur may be minimised and spatial resolution may be maximised.

BRIEF DESCRIPTION OF THE DRAWINGS

Embodiments of the present disclosure may take form in various components and arrangements of components, and in various steps and arrangements of steps. Accordingly, the drawings are for purposes of illustrating the various embodiments and are not to be construed as limiting the embodiments. In the drawing figures, like reference numerals refer to like elements. In addition, it is to be noted that the figures may not be drawn to scale.

DETAILED DESCRIPTION OF THE EMBODIMENTS

Figure 1:
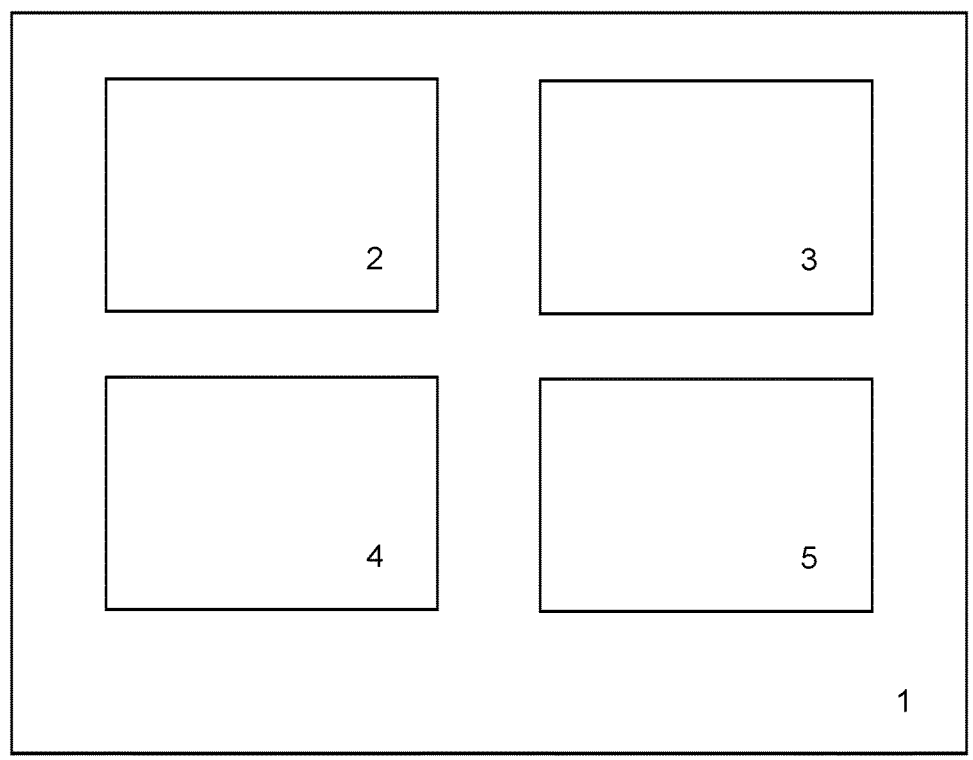
FIG. 1 is a block diagram of an imaging system according to a general embodiment of the invention.

The embodiments of the present disclosure and the various features and advantageous details thereof are explained more fully with reference to the non-limiting examples that are described and/or illustrated in the drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the embodiments of the present may be practiced and to further enable those of skill in the art to practice the same. Accordingly, the examples herein should not be construed as limiting the scope of the embodiments of the present disclosure, which is defined solely by the appended claims and applicable law.

It is understood that the embodiments of the present disclosure are not limited to the particular methodology, protocols, devices, apparatus, materials, applications, etc., described herein, as these may vary. It is also to be understood that the terminology used herein is used for the purpose of describing particular embodiments only, and is not intended to be limiting in scope of the embodiments as claimed. It must be noted that as used herein and in the appended claims, the singular forms "a," "an," and "the" include plural reference unless the context clearly dictates otherwise.

Unless defined otherwise, all technical and scientific terms used herein have the same meanings as commonly understood by one of ordinary skill in the art to which the embodiments of the present disclosure belong. Preferred methods, devices, and materials are described, although any methods and materials similar or equivalent to those described herein may be used in the practice or testing of the embodiments.

As discussed above, it is desirable to provide a spectral imaging system and method in which movement of the subject being imaged may be compensated for by aligning the frames of the spectral image, such that blur may be minimised and spatial resolution may be maximised. Embodiments of the present invention provide an imaging system and imaging method in which motion vectors are calculated and applied to the spectral image frames, such as the frames of a hyperspectral image, so that the frames taken by a spectral camera are aligned. The motion vectors are calculated from the frames of a reference image. Embodiments of the present invention may be considered to relate to multispectral imaging, hyperspectral imaging, image registration and/or image alignment.

FIG. 1 shows a block diagram of an imaging system according to a general embodiment of the invention. The imaging system 1 comprises a spectral camera 2, a reference camera 3, a calculation unit 4 and an alignment unit. S. The spectral camera 2 is configured to capture a spectral image of a subject that is being imaged, such as, for example, a human subject. The reference camera 3 is configured to capture a reference image of the subject. The reference image may be captured at a predetermined wavelength and/or a predetermined bandwidth. The calculation unit 4 is configured to calculate a motion vector for each reference frame of a subset of the plurality of reference frames. The alignment unit 5 is configured to align the spectral frames with each other by applying each calculated motion vector to the spectral frame of the plurality of spectral frames to which it corresponds.

The arrangement of the imaging system 1 is shown in FIG. 1 only as an exemplary block diagram to aid understanding, and the components of the imaging system may be arranged differently, in accordance with embodiments of the present invention. For example, the spectral camera 2 and the reference camera 3 may share elements or may be individual components that are spatially separated. The calculation unit 4 and the alignment unit 5 may be provided by a processor, or separate processors, as part of a computer system configured to process the image data captured by the spectral camera 2 and the reference camera 3. The calculation unit 4 may be provided as part of the spectral camera 2 and/or the reference camera 3. Similarly, the alignment unit 5 may be provided as part of the spectral camera 2 and/or the reference camera 3.

Figure 2:
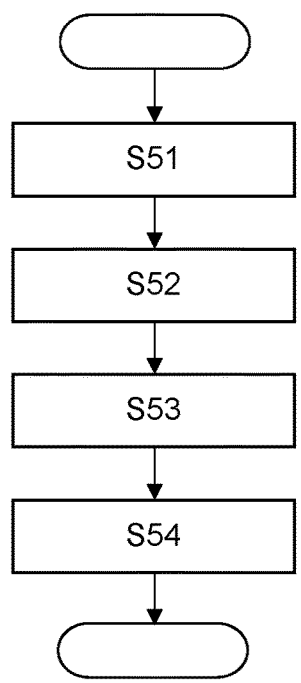
FIG. 2 is a flow chart of an imaging method according to a general embodiment of the invention.

FIG. 2 shows a flow chart of an imaging method according to a general embodiment of the invention. At step S51, a spectral image of a subject is captured. The spectral image is captured in a time period that is a spectral capture period, comprising a plurality of spectral time points. The captured spectral image comprises a plurality of spectral frames each captured at a wavelength of a plurality of wavelengths and each corresponding to a spectral time point of the plurality of spectral time points. Each spectral frame may be captured at a different wavelength, or one or more spectral frames may be captured at the same wavelength. A reference image of the subject is captured at step S52. The reference image may be captured at a predetermined wavelength and/or a predetermined bandwidth. The reference image is captured in a time period which is a reference capture period, comprising a plurality of reference time points. The reference capture period corresponds to the spectral capture period. The reference image comprises a plurality of reference frames each corresponding to a reference time point of the plurality of reference time points and a spectral frame of the plurality of spectral frames. At step S53 a motion vector for each reference frame of a subset of the plurality of reference frames is calculated. Finally, the spectral frames are aligned with each other at step S54. The spectral frames are aligned by applying each calculated motion vector to the spectral frame of the plurality of spectral frames to which it corresponds.

The present invention relates to spectral imaging and, in particular, an embodiment of an aspect of the invention relates to spectral imaging of human subjects. The spectral imaging system may be a high-resolution hyperspectral imaging system comprising a hyperspectral camera for imaging of human subjects. However, when imaging human subjects, the subjects may move, either voluntarily or involuntarily, during the imaging process.

According to embodiments of the present invention, the spatially-dependent imaging artefacts due to the natural motion of human subjects during the process of capturing multiple hyperspectral or multispectral image frames may be compensated by applying motion vectors to each image frame. The motion vectors are derived from image frames simultaneously captured using a reference camera (reference frames). Embodiments of the present invention may therefore allow for motion artefact-free spectral analysis at each image pixel resulting in high-resolution composite images.

The reference camera may have a common imaging axis with the hyperspectral camera, such that the images of both cameras are captured along a common imaging axis. The imaging axes of the cameras could also be substantially common such that the imaging axis of the reference camera corresponds and is comparable to the imaging axis of the spectral camera but is not identical. For example, the spectral camera and the reference camera may be provided as part of the same imaging element but may be adjacent to each other such that the imaging axes are not identical but are similar. A specific example is a case where a hyper-/multi-spectral camera is positioned in a smartphone next to a regular RGB camera. The imaging axes may therefore be identical or similar.

In order to allow for motion estimation of objects captured by the reference camera and to apply the estimated motion to the spectral camera, both cameras should have a substantially common view of the object (subject). Therefore, the angle between the axis of the reference camera and that of the spectral camera should not be more than a few (for example, 2) degrees apart. At an object distance of 1 m (i.e. if the subject is at a distance of 1 m from the cameras), this translates to the spectral camera and the reference camera being approximately a few centimetres apart. However, for cases where the object is substantially flat, larger angles are tolerable.

As discussed above, a spectral image, typically consists of a sequence of frames (which may be considered as a short movie) where, for each frame, a filter is tuned to a specific wavelength. In a hyperspectral image, each frame may be captured at a different wavelength from wavelengths of contiguous spectral bands, for example, from the UV range to the infrared range. A hyperspectral image scan therefore takes up to a couple of seconds to be completed.

When imaging human subjects, the human subject will typically make minute movements during the scan. One is typically interested in the spectrum at a particular spatial location in spectral imaging and so it is essential that all of the captured frames of the spectral image are aligned. That is, for a certain point of the subject, such as, for example, a human face, that was scanned at wavelength 440 nm and resides at coordinates (X, Y), the exact same point of the face scanned at, for example, 700 nm, should reside at the same coordinates (X, Y). If the point does not occur at the same coordinates in the multiple frames, any processing done may result in blur and lowered spatial contrast.

Figure 3:
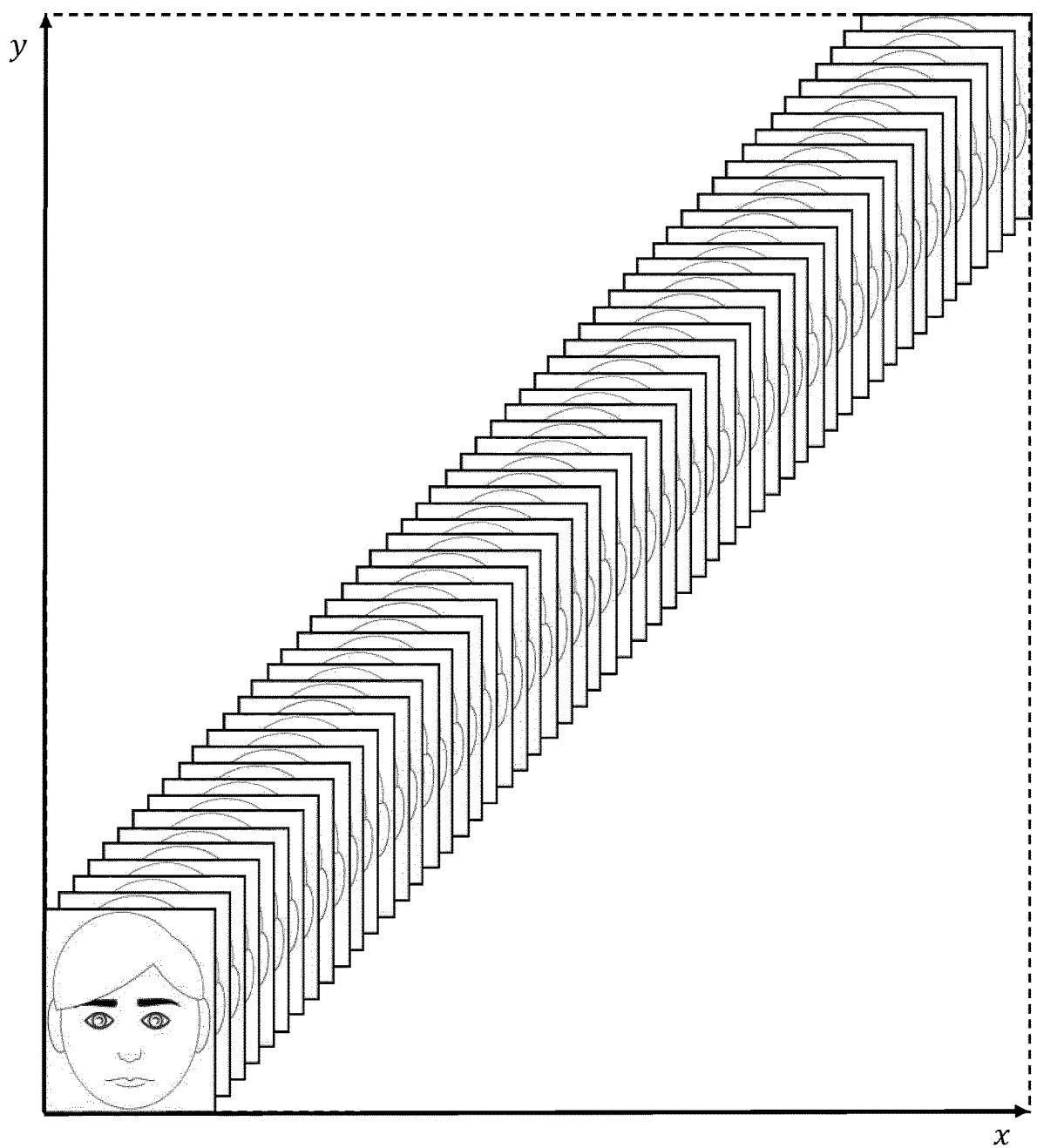
FIG. 3 is a diagram showing an example hyperspectral image comprising a plurality of hyperspectral frames.

FIG. 3 is a diagram showing an example spectral image comprising a plurality of spectral frames. Specifically, the spectral image may be a hyperspectral image of the human face comprising a plurality of hyperspectral frames. Each of the plurality of hyperspectral frames is captured at a wavelength of a plurality of wavelengths. That is, for each frame, a filter of the hyperspectral camera is tuned to a specific wavelength so that the frame is captured at the specific wavelength. Each spectral frame may be captured at a different wavelength, or one or more spectral frames may be captured at the same wavelength.

The x-axis in FIG. 3 represents time and the y-axis represents wavelength values. Thus it can be seen for each time point in a time period, a frame is captured at a wavelength. The wavelengths may be wavelengths of a plurality of contiguous spectral bands and may extend from the UV range up to and including the infrared range. Each spectral frame may be captured at a different wavelength, or one or more spectral frames may be captured at the same wavelength. In contrast to traditional photography where only a red, green and blue image are derived, a plurality (stack, sequence, collection, etc.) of images (referred to as frames) at different wavelengths is generated.

The process of image alignment in hyperspectral or multispectral imaging is further hindered by the fact that images may have very limited spatial contrast or detail at certain wavelengths (for example, in the IR range). For example, a frame captured at a wavelength in the visible spectrum, such as 490 nm, will have much higher spatial detail than a frame at a wavelength in the IR range, such as 1010 nm. It is also noted that even if maximum mechanical stability is ensured, small movements are still likely to occur.

As discussed above, the main elements of embodiments of the present invention comprise: a spectral imaging camera assembly (such as multispectral or hyperspectral; for imaging a subject that sequentially takes images (frames) at wavelengths producing a sequence of images; a reference camera assembly that images the subject at a fixed bandwidth and wavelength(s), configured to have a common (or substantially common) imaging axis with the spectral imaging camera assembly; simultaneous recording of image frames by the spectral imaging camera and reference camera; calculation of motion vectors from the reference image frames; and application of the calculated motion vectors to the spectral image frames to align the frames.

Figure 4:
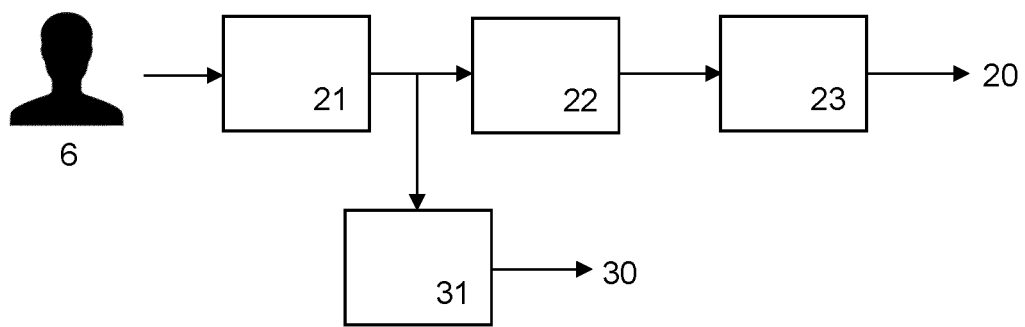
FIG. 4 is a block diagram of an example camera configuration according to an embodiment of an aspect of the invention.

FIG. 4 is a block diagram of an example camera configuration according to an embodiment of an aspect of the invention. The camera configuration captures images of a subject 6 and outputs a hyperspectral image 20 comprising a plurality of hyperspectral frames and a reference image comprising a plurality of reference frames 30. The camera configuration of FIG. 4 comprises optics 21, a tunable filter 22, a wideband imaging sensor 23 and an RGB imaging sensor 31.

The camera configuration can be considered to comprise a hyperspectral imaging system, including the optics 21, the tunable filter 22 and the wideband imaging sensor 23, and a reference camera system, including the RGB imaging sensor 31 and sharing the optics 21 of the hyperspectral system (excluding the tunable filter 22). The light reflected from the subject 6 is captured by the optics 21 of the system. This light is fed through the tunable filter 22 that, for each frame of the hyperspectral image, moves to a particular wavelength. The wideband imaging sensor 23 captures the light coming through the tunable filter 22 into a sequence of hyperspectral frames that provide the hyperspectral image. In parallel, the light captured by the optics 21 is also fed to the RGB imaging sensor 31, which outputs a sequence of RGB frames that provide the reference image.

An important aspect of the reference camera is that it should provide a reference image and reference frames with sufficient spatial detail. This may typically be realised by choosing suitable optics of the reference system in that capture a significant portion of the visible spectrum. The reference camera may therefore be a camera that captures a wideband visible range, and may alternatively be a narrowband camera provided that the bandwidth of the camera is chosen to capture sufficient spatial detail and resolution. For the application of full face hyperspectral/multispectral imaging, it may be preferable for the reference camera to have at least a VGA resolution (640×480 pixels). The reference camera may be an RGB camera or a grayscale camera.

The spatial detail of the reference image is required so that the displacement between the reference frames may be determined. The displacement cannot be determined directly from the spectral image because the spatial detail of frames of the spectral image at particular wavelengths is not good enough to determine the displacement. For example, the spatial detail of a spectral frame captured at a wavelength in the IR range will be greatly reduced compared to that of a reference frame.

The mapping vectors are determined from the reference frames of the reference image. As a first step the movement of the subject using the reference camera (such as an RGB camera) is estimated. For this purpose, the RGB image (signal) may first be converted to a grayscale image comprising a plurality of grayscale frames. The grayscale frames are then fed through a motion estimator that estimates the amount of (local) displacement for each frame with respect to a pre-defined reference frame, for example, the first frame.

In other words, the motion vectors are estimated by estimating the local displacement of a first frame towards a second reference frame. Hence, given two images of H×W pixels, the output is a displacement map of H×W pixels, describing how much each pixel of the first frame needs to be displaced in order to be mapped onto the reference frame. Many algorithms for determining the displacement are known in the art, such as, for example, Farnebäck's optical flow.

As a result, for each RGB frame the amount of (local) displacement is known. These displacements now need to be superimposed onto the hyperspectral frames. First of all, despite sharing the optics, due to different sensor sizes, as well as minute displacements of the sensors, the hyperspectral and RGB frames will typically not perfectly match. Hence, before displacements are superimposed they need to be mapped. For this purpose, a predetermined mapping function is used to map the reference frames to the spectral frames. It is further noted that, despite the fact that both the reference camera and the hyper-/multi-spectral camera may (substantially) share the same optical axis, due to different sensor sizes, resolutions and additional optical elements in the part where the optical trajectories towards both cameras are different, an object at a pixel location (x, y) in the reference frame does not correspond to that same pixel location (x, y) in a hyper-/multi-spectral frame. The mapping is provided to compensate for the difference. Effectively, any mapping that creates a wideband representation of the original image is appropriate.

The mapping may also be calculated, with the following two techniques provided for the calculation. The two methods for calculating the mapping may be considered as offline versus online.

In the first technique, a set of images are captured and, for these images, a large number of points are manually annotated dually in hyperspectral and RGB camera images. The points may be, for example, individual hairs, wrinkles, eyes, freckles, etc. A regression is then conducted between both sets of points which effectively leading to a mapping formula. Images of a reference object with sufficient spatial detail, such as a camera resolution test chart, may preferably be used.

With this first technique, the idea is to find a mapping telling how pixel position (x, y) of the reference camera maps onto the pixel position (x', y)' on the hyper-/multi-spectral camera. Based on one or more images taken, a person annotates a large set of matching pairs of coordinates (x, y), (x', y'). These pairs are then all fed into an algorithm that finds the best parameterization for mapping any (x, y) into (x', y'). In a very simple example, the algorithm would find the a, b, c and d of: x'=(a*x)+(b*y); and y'=(c*x)+(d*y).

In the second technique, landmark detection techniques (such as, for example, Scale Invariant Feature Transforms—SIFT) are applied on both one of the hyperspectral frames and one of the RGB frames that are shot at approximately the same time point. A homomorphic mapping technique (such as, for example, random sample consensus—RANSAC) is then used to determine an optimal mapping between the hyperspectral frame and the RGB frame.

This second technique tries to establish something similar to the first technique, but feature detection and matching/filtering are used to find matching points (the pairs of coordinates). This has as an advantage that small deviations that occur (over time and/or over device) will be compensated for. The disadvantage of this second technique is the additional complexity and the possible introduction of errors if poor matches are being made.

After the mapping function is determined, the detected motion is mapped through the mapping function for each reference frame and applied to the corresponding hyperspectral frame of the hyperspectral image. As a result the sequence of hyperspectral images will be properly aligned. As discussed above, a grayscale or narrowband camera may be used instead of an RGB camera as the reference camera. Any camera in which sufficient spatial detail is present in the image is suitable.

As may be seen from the above, embodiments of the present invention may provide an imaging system in which frames of a spectral image are aligned using a reference image, such that movement of the subject being imaged during the image process may be compensated for and blur may be minimised and spatial resolution may be maximised. Embodiments of the present invention may overcome disadvantages in the art discussed above.

Although only a few exemplary embodiments have been described in detail above, those skilled in the art will readily appreciate that many modifications are possible in the exemplary embodiments without materially departing from the novel teachings and advantages of the embodiments of the present disclosure. The above-described embodiments of the present invention may advantageously be used independently of any other of the embodiments or in any feasible combination with one or more others of the embodiments.

Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

In addition, any reference signs placed in parentheses in one or more claims shall not be construed as limiting the claims. The word "comprising" and "comprises," and the like, does not exclude the presence of elements or steps other than those listed in any claim or the specification as a whole. The singular reference of an element does not exclude the plural references of such elements and vice-versa. One or more of the embodiments may be implemented by means of hardware comprising several distinct elements. In a device or apparatus claim enumerating several means, several of these means may be embodied by one and the same item of hardware. The mere fact that certain measures are recited in mutually different dependent claims does not indicate that a combination of these measures cannot be used to an advantage.

The invention claimed is:

1. An imaging system for imaging of subjects, the imaging system comprising:
 a spectral camera configured to capture a spectral image of a subject in a spectral capture period comprising a plurality of spectral time points, the spectral image comprising a plurality of spectral frames each captured at a wavelength of a plurality of wavelengths and each corresponding to a spectral time point of the plurality of spectral time points;
 a reference camera configured to capture a reference image of the subject in a reference capture period comprising a plurality of reference time points and corresponding to the spectral capture period, the reference image comprising a plurality of reference frames each corresponding to a reference time point of the plurality of reference time points and a spectral frame of the plurality of spectral frames;
 a processor;
 a memory that stores instructions, which when executed by the processor, causes the processor to: calculate a motion vector for each reference frame of a subset of the plurality of reference frames; align the spectral frames with each other by applying each calculated motion vector to the spectral frame of the plurality of spectral frames to which it corresponds; calculate each of the motion vectors by: estimating an amount of spatial displacement for each of the plurality of reference frames with respect to a given reference frame of the plurality of reference frames, map the displacement for each reference frame using a predetermined mapping function between the reference frames and the hyperspectral frames; and align the spectral frames with each other by: applying the mapped displacement for each reference frame to the corresponding spectral frame.

2. The imaging system of claim 1, wherein an imaging axis of the spectral camera corresponds to an imaging axis of the reference camera.

3. The imaging system of claim 1, wherein the reference camera is a wideband visible range camera.

4. The imaging system of claim 1, wherein the reference camera is a narrowband camera.

5. The imaging system of claim 1, wherein the reference camera is one of:
 a monochrome camera; and
 an RGB camera.

6. The imaging system of claim 1, wherein the reference camera is configured to capture the reference image at one of more of:
 a predetermined wavelength; and
 a predetermined bandwidth.

7. The imaging system of claim 1, wherein the spectral camera comprises:
 optics configured to capture light reflected from the subject;
 a tunable filter through which the captured light passes and configured to filter the light to a wavelength of the plurality of wavelengths; and
 a wideband imaging sensor configured to capture the light coming through the tunable filter into a spectral frame.

8. The imaging system of claim 1, wherein the reference camera comprises:
 optics configured to capture light reflected from the subject; and
 an imaging sensor through which the captured light passes and configured to output a reference frame.

9. The imaging system of claim 1, wherein the instructions further cause the processor to align the spectral frames such that an alignment site of the subject has the same coordinates in each of the spectral frames.

10. The imaging system of claim 9, wherein the alignment site of the subject corresponds to a spatial location associated with a position of the subject with respect to the imaging system.

11. The imaging system of claim 1, wherein
 the spectral camera is a hyperspectral camera, the spectral image is a hyperspectral image and the plurality of spectral frames are hyperspectral frames; or
 the spectral camera is a multispectral camera, the spectral image is a multispectral image and the plurality of spectral frames are multispectral frames.

12. An imaging method for imaging of subjects, the method comprising:
 capturing a spectral image of a subject in a spectral capture period comprising a plurality of spectral time points, the spectral image comprising a plurality of spectral frames each captured at a wavelength of a plurality of wavelengths and each corresponding to a spectral time point of the plurality of spectral time points;
 capturing a reference image of the subject in a reference capture period comprising a plurality of reference time points and corresponding to the spectral capture period, the reference image comprising a plurality of reference frames each corresponding to a reference time point of the plurality of reference time points and a spectral frame of the plurality of spectral frames;
 calculating a motion vector for each reference frame of a subset of the plurality of reference frames;
 aligning the spectral frames with each other by applying each calculated motion vector to the spectral frame of the plurality of spectral frames to which it corresponds;

calculating each of the motion vectors by estimating an amount of spatial displacement for each of the plurality of reference frames with respect to a given reference frame of the plurality of reference frames; and mapping the displacement for each reference frame using a predetermined mapping function between the reference frames and the hyperspectral frames; and aligning the spectral frames with each other by:

applying the mapped displacement for each reference frame to the corresponding spectral frame.

13. The method of claim 12, wherein an imaging axis of the spectral camera corresponds to an imaging axis of the reference camera.

14. The method of claim 12, wherein the reference camera is a wideband visible range camera.

15. The method of claim 12, wherein the reference camera is a narrowband camera.

16. The method of claim 12, wherein the reference camera is one of:

a monochrome camera; and an RGB camera.

17. The method of claim 12, wherein the spectral camera comprises:

optics configured to capture light reflected from the subject;

a tunable filter through which the captured light passes and configured to filter the light to a wavelength of the plurality of wavelengths; and a wideband imaging sensor configured to capture the light coming through the tunable filter into a spectral frame.

18. A tangible non-transitory computer readable medium that stores instructions, which when executed by a processor, causes the processor to:

capture a spectral image of a subject in a spectral capture period comprising a plurality of spectral time points, the spectral image comprising a plurality of spectral frames each captured at a wavelength of a plurality of wavelengths and each corresponding to a spectral time point of the plurality of spectral time points;

capture a reference image of the subject in a reference capture period comprising a plurality of reference time points and corresponding to the spectral capture period, the reference image comprising a plurality of reference frames each corresponding to a reference time point of the plurality of reference time points and a spectral frame of the plurality of spectral frames;

calculate a motion vector for each reference frame of a subset of the plurality of reference frames;

align the spectral frames with each other by applying each calculated motion vector to the spectral frame of the plurality of spectral frames to which it corresponds;

calculate each of the motion vectors by estimating an amount of spatial displacement for each of the plurality of reference frames with respect to a given reference frame of the plurality of reference frames; and mapping the displacement for each reference frame using a predetermined mapping function between the reference frames and the hyperspectral frames; and align the spectral frames with each other by:

applying the mapped displacement for each reference frame to the corresponding spectral frame.

19. The tangible, non-transitory computer readable medium of claim 18, wherein the instructions further cause the processor to align the spectral frames such that an alignment site of the subject has the same coordinates in each of the spectral frames.

20. The tangible, non-transitory computer readable medium of claim 19, wherein the alignment site of the subject corresponds to a spatial location associated with a position of the subject.

* * * * *